(12) United States Patent
Liang et al.

(10) Patent No.: US 11,967,450 B2
(45) Date of Patent: Apr. 23, 2024

(54) PLASTIC BACK CRYSTAL WINDOW WITH INSERT-MOLDED PLANAR COIL

(71) Applicant: Apple Inc., Cupertino, CA (US)

(72) Inventors: Jiahui Liang, Sunnyvale, CA (US); Eric X. Zhou, San Jose, CA (US)

(73) Assignee: APPLE INC., Cupertino, CA (US)

( * ) Notice: Subject to any disclaimer, the term of this patent is extended or adjusted under 35 U.S.C. 154(b) by 1004 days.

(21) Appl. No.: 16/579,541

(22) Filed: Sep. 23, 2019

(65) Prior Publication Data

US 2021/0091590 A1 Mar. 25, 2021

(51) Int. Cl.
| | |
|---|---|
| *H02J 7/00* | (2006.01) |
| *H01F 27/28* | (2006.01) |
| *H01F 27/32* | (2006.01) |
| *H02J 7/02* | (2016.01) |
| *H02J 50/00* | (2016.01) |
| *H02J 50/10* | (2016.01) |

(52) U.S. Cl.
CPC ....... *H01F 27/2871* (2013.01); *H01F 27/327* (2013.01); *H02J 7/0042* (2013.01); *H02J 7/02* (2013.01); *H02J 50/005* (2020.01); *H02J 50/10* (2016.02)

(58) Field of Classification Search
None
See application file for complete search history.

(56) References Cited

U.S. PATENT DOCUMENTS

| | | | |
|---|---|---|---|
| 9,460,846 B2 | 10/2016 | Graham et al. | |
| 10,062,492 B2 | 8/2018 | Wagman et al. | |
| 10,993,515 B1* | 5/2021 | Kim | H02J 7/0044 |
| 2012/0119708 A1* | 5/2012 | Toya | H02J 50/70 |
| | | | 320/108 |
| 2014/0184150 A1* | 7/2014 | Walley | H02J 50/12 |
| | | | 320/108 |
| 2015/0280322 A1* | 10/2015 | Saito | H02J 50/10 |
| | | | 343/788 |
| 2016/0118820 A1* | 4/2016 | Tsujiko | H01M 10/48 |
| | | | 320/148 |
| 2017/0054318 A1 | 2/2017 | Matsuyuki et al. | |

FOREIGN PATENT DOCUMENTS

| | | |
|---|---|---|
| JP | 3210885 U | 5/2017 |
| KR | 101917901 B1 | 11/2018 |
| WO | 2012142040 A1 | 10/2012 |
| WO | 2015167776 A1 | 11/2015 |

\* cited by examiner

*Primary Examiner* — Arun C Williams
(74) *Attorney, Agent, or Firm* — Dorsey & Whitney LLP

(57) ABSTRACT

An electronic device can include a housing component at least partially defining an internal volume and including a wall. A component can be disposed within the wall and at least partially surrounded by a material forming the housing. A battery can be disposed in the internal volume and electrically connected to the component.

17 Claims, 13 Drawing Sheets

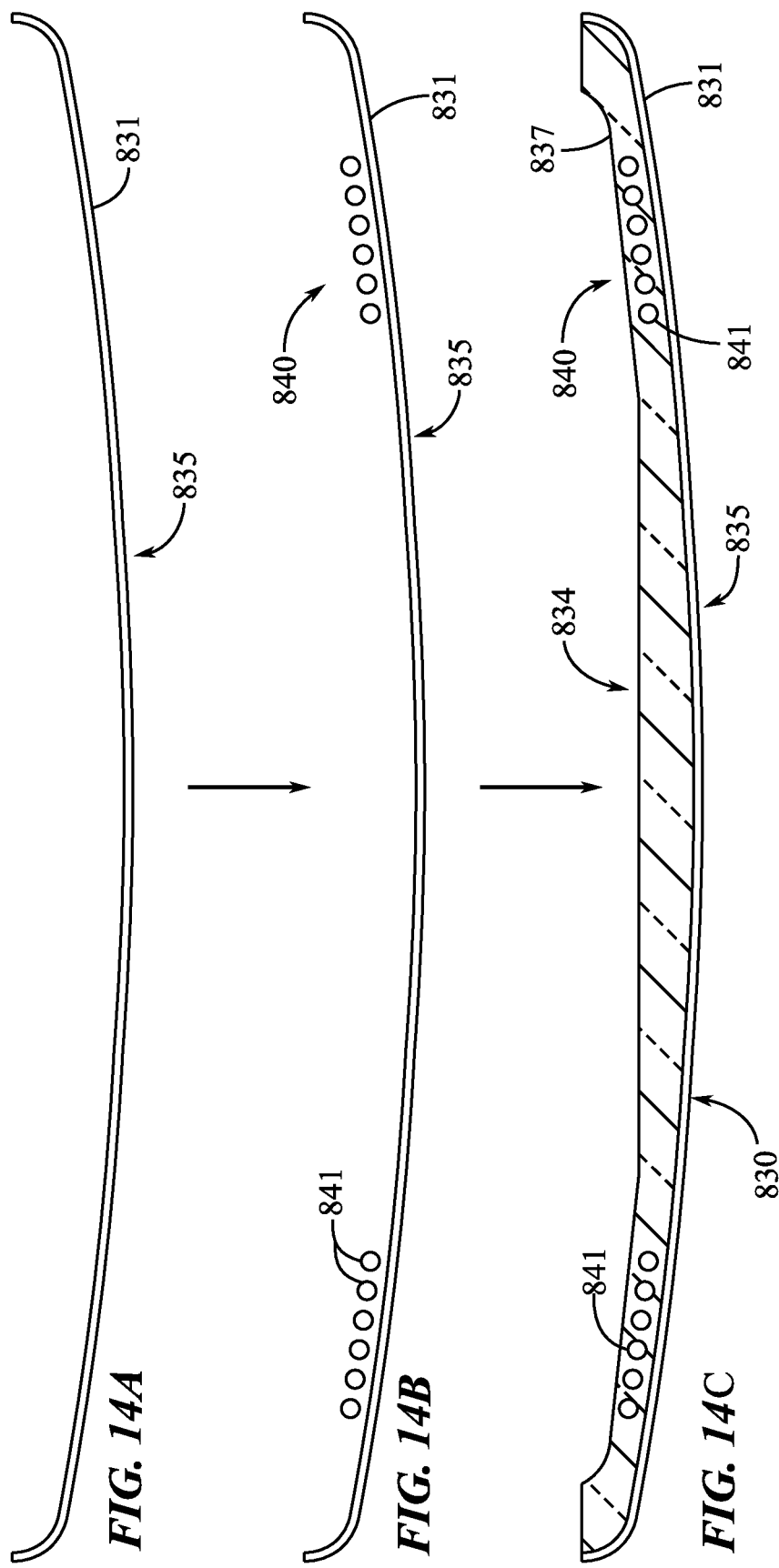

PLASTIC BACK CRYSTAL WINDOW WITH INSERT-MOLDED PLANAR COIL

FIELD

The described embodiments relate generally to electronic devices. More particularly, the present embodiments relate to wireless charging components for electronic devices.

BACKGROUND

Portable electronic devices are widespread in society and can take a variety of forms, from wristwatches to computers. As portable electronic devices continue to include an increasing number of features that rely on power from a battery, the need for fast, convenient, and efficient battery charging increases. Additionally, there is a strong demand for electronic devices, especially portable electronic devices such as handheld phones, tablet computers, and watches, to be thin and lightweight, while simultaneously including numerous features and delivering high performance. Thus, there exists a demand for efficient charging while simultaneously keeping the electronic device thin and lightweight. Further, in efforts to improve charging convenience, many electronic devices now allow for inductive charging. Accordingly, it can be desirable to construct portable electronic devices in a way that enhances charging efficiency while also minimizing device size.

SUMMARY

According to some examples of the present disclosure, an electronic device includes a housing component at least partially defining an internal volume and including a wall, a component disposed within the wall, and a battery disposed in the internal volume and electrically connected to the component. The housing component can comprise a housing material and the component can be at least partially surrounded by the housing material. The material can include a transparent polymer material.

In some examples, the component can comprise an inductive charging component. The component can comprise a sensor in communication with the ambient environment through the housing component. The housing can at least partially define an exterior surface of the electronic device. The exterior surface can be non-planar. The component can include a coil of conductive material having a profile conforming to the non-planar exterior surface. The housing component can further include a lens. The electronic device can comprise a display assembly at least partially defining an exterior surface of the device.

According to some examples, a housing for an electronic device includes a transparent portion at least partially defining an internal volume, and an inductive charging component encompassed by the transparent portion. The transparent portion can define a non-planar exterior surface. The transparent portion can include a transparent polymer. The inductive charging component can include a coil of conductive material having a profile that conforms to the non-planar exterior surface.

In some examples, the transparent portion can include a first transparent material defining an exterior surface of the housing, and a second transparent material adjacent to the first transparent material and encompassing the inductive charging component. The first transparent material can include a ceramic material. The second transparent material can include a polymeric material. The inductive charging component can be separated from an ambient environment by less than 5 millimeters. The inductive charging component can have a k-value of at least 0.6. The transparent portion can include polycarbonate.

According to some examples, a method of forming a housing component for an electronic device includes forming a material around an inductive charging coil to form the housing component, the inductive charging coil comprising a single layer spiral coil disposed in a non-planar arrangement. The material can be transparent. The housing component can include a transparent back cover of the electronic device. Forming the material can include a two-shot molding process. The material can be a first material and providing the inductive charging coil can include providing the inductive charging coil into a trench etched into a component including a second material.

BRIEF DESCRIPTION OF THE DRAWINGS

The disclosure will be readily understood by the following detailed description in conjunction with the accompanying drawings, wherein like reference numerals designate like structural elements, and in which:

FIGS. 14A-14C show various stages of a process for forming a component.

DETAILED DESCRIPTION

Figure 1:
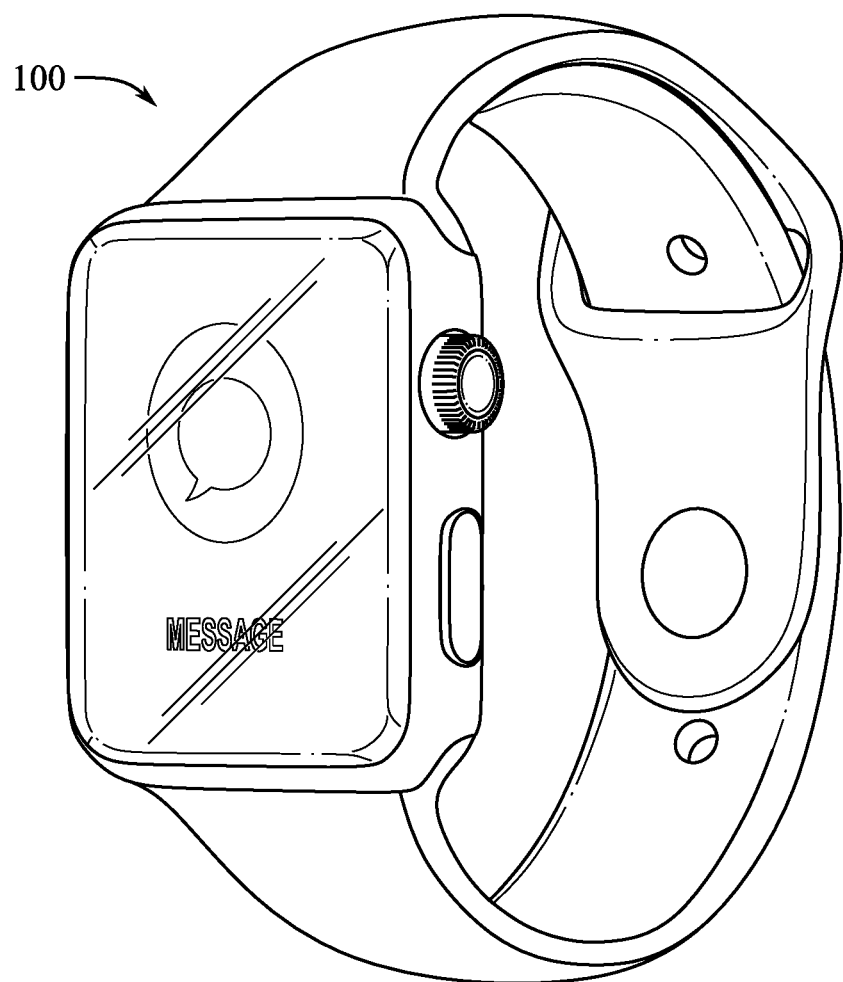
FIG. 1 shows a front perspective view of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments, as defined by the appended claims.

Portable electronic devices increasingly include features and functionality that require additional power consumption. Because space is limited in portable electronic devices, there are constraints on the battery size, limiting the amount of power that can be used to provide desired features and functionalities. Thus, it can be desirable for a portable electronic device to have the ability to charge its battery quickly. A wound coil is an efficient way for inductive charging in consumer electronics. However, these coils must meet design space constraints inside portable electronic devices and face efficiency constraints. Inductive charging, also known as wireless charging, is a type of charging that uses an electromagnetic field to transfer energy between two objects using electromagnetic induction. Inductive charging usually originates from a base charging station. Energy in the form of an electromagnetic field is propagated from the base station via an inductive component (e.g., first induction coil). The electromagnetic field induces an electrical current in a proximate electrical device (e.g., via a second induction coil). The electrical device can use that energy to charge a battery in the electrical device. Thus, wireless charging provides a convenient and aesthetically pleasing way of charging an electrical device because there is no need for cable plug-ins between the device and the power source. The inductive charging methods discloses herein can comply with Qi and PMA wireless charging standards, as well as any other charging standards.

Despite the benefits, there are disadvantages and challenges that arise from wireless charging. For instance, inductive charging is not as efficient as traditional direct charging. Thus, due to the lower efficiency, devices being inductively charged can take longer to charge than traditional methods. Inductive chargers can also increase the complexity and cost of manufacturing the device. Further, the range that inductive charging can work is limited, and depends on the size and shape of the antenna devices (e.g., inductive coils). The power transmitted via induction decreases with distance. For instance, if the distance between the first coil and the second coil is much larger than the diameter of the coils, very little power will be received by the portable electronic device. Accordingly, examples provided herein disclose an electronic device which can improve efficiency and decrease charging time by minimizing the distance between the charging base and the inductive charging component.

The insert-molded inductive component designs described herein can allow for improved charging efficiency and reduced charging time thanks to the coil design and smaller distance between the inductive charging component in the electronic device and the charging base. The design also frees up internal space by embedding the inductive charging component directly inside a wall of the housing. The available space can then be allocated to a larger battery with increased capacity, other components, functions, or features. The unused space can also be removed to make the product smaller and/or slimmer without compromising other modules. Embedding the inductive charging component can also eliminate coil assembly steps such as scanning, inspection, applying glue, attaching coil to the housing, etc., which contributes to overall cost reduction.

One aspect of the present disclosure relates to an electronic device capable of wireless charging. The electronic device can include a housing component that at least partially defines an internal volume. The housing component can include one or more walls having a thickness. An inductive charging component, such as a coil that is concentrically wound, can be disposed within the housing, and specifically, within the wall. For instance, the inductive charging component can be embedded or molded in a back portion of a smartwatch or a smartphone. The inductive charging component can be at least partially surrounded by a material including the housing, such that the inductive charging component is disposed within the housing thickness and adjacent an exterior surface of the housing. The material forming at least a portion of the housing, and into which the inductive charging component is disposed, can include a transparent component made from a polymer material, a ceramic material, an amorphous material such as glass, or combinations thereof. For example, the transparent component can be sapphire or a polyamide material. A battery can be disposed in the internal volume defined by the housing. The battery can be electrically connected to the inductive charging component embedded in the housing wall.

In some aspects, the transparent component can include a first transparent material defining an exterior surface of the housing and a second transparent material adjacent to the first transparent material and encompassing the inductive charging component. The first transparent material can include a polymer or glass material and the second transparent material can include an epoxy or other curable material. In some examples, a recess is carved or etched into the transparent component to allow space for the inductive charging component to be disposed. The aspects disclosed herein can be implemented in a smartphone, a smartwatch, or any other electronic device that implements wireless or inductive charging.

These and other examples are discussed below with reference to FIGS. 1-16. However, those skilled in the art will readily appreciate that the detailed description given herein with respect to these figures is for explanatory purposes only, and should not be construed as limiting.

FIG. 1 shows an example of an electronic device 100. The electronic device shown in FIG. 1 is a watch, such as a smartwatch. The smartwatch 100 of FIG. 1 is merely one representative example of a device that can be used in conjunction with the components and methods disclosed herein. The electronic device 100 can correspond to any form of portable electronic device, a smartphone, a media player, a media storage device, a portable digital assistant ("PDA"), a tablet computer, a computer, a mobile communication device, a GPS unit, a remote control device, and other similar electronic devices. The electronic device 100 can be referred to as an electronic device, or a consumer device. Further details of the smartwatch 100 are provided below with reference to FIG. 2.

Figure 2:
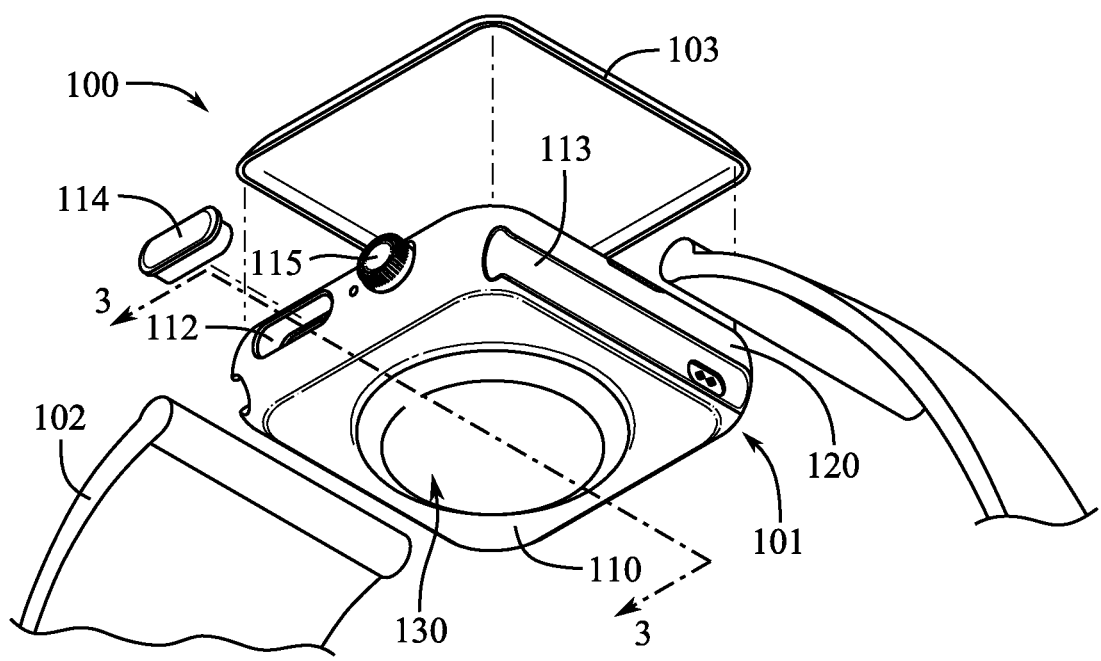
FIG. 2 shows an exploded rear perspective view of the electronic device of FIG. 1.

Referring now to FIG. 2, the electronic device 100 can include a housing 101, and a cover 103 attached to the housing 101. The housing 101 can substantially define at least a portion of an exterior surface of the device 100, and can include a base and sidewalls, such as sidewall 120. The cover 103 can include glass, ceramic, plastic, or any other substantially transparent material, component, or assembly. The cover 103 can cover or otherwise overlay a display, a camera, a touch sensitive surface such as a touchscreen, or other component of the device 100. The cover 103 can define a front exterior surface of the device 100.

A back cover 110 can also be attached to or form part of the housing 101, for example, opposite the cover 103. The back cover 110 can include ceramic, plastic, metal, or combinations thereof. In some examples, the back cover 110 can include a component 130, also referred to as an at least partially electromagnetically transparent component 130. The at least partially electromagnetically transparent component 130 can include one or more portions that are transparent to any desired wavelength of electromagnetic radiation, such as visible light, infrared light, radio waves, or combinations thereof. The transparent component 130 can be configured not to inhibit nor interfere with an electromagnetic field. The transparent component 130 can include one or more opaque portions disposed between the electromagnetically transparent portions. In some examples, the transparent portions of the component 130 can be disposed over one or more electromagnetic radiation emitters and/or detectors, while the opaque portions can inhibit or prevent electromagnetic radiation emitted by an emitter from leaking to a detector along an undesirable pathway. Together, the housing 101, the cover 103, and the back cover 110 can substantially define an interior volume and an exterior surface of the device 100.

The device 100 can also include internal components, such as an inductive charging component, a haptic engine, a battery, and a system in package (SiP), including one or more integrated circuits, such as processors, sensors, and memory. The SiP can also include a package. The device 100 can further include one or more electromagnetic radiation emitters and detectors, such as light emitting diodes, cameras, optical detectors, infrared detectors, and other detectors and/or emitters. These emitters and detectors can be associated with one or more systems of the device, such as a camera system, a vision system, and/or a biometric system. The internal components, such as one or more emitters and detectors, can be disposed within an internal volume defined at least partially by the housing 101, and can be affixed to the housing 101 via internal surfaces, attachment features, threaded connectors, studs, posts, or other features, that are formed into, defined by, or otherwise part of the housing 101 and/or the cover 103 or back cover 110. In some examples, the attachment features can be formed relatively easily on interior surfaces of the housing 101, for example, by machining.

The housing 101 can be a substantially continuous or unitary component, and can include one or more openings 112 to receive components of the electronic device 100, such as a button 114, and/or provide access to an internal portion of the electronic device 100. In some examples, the device 100 can include input components such as one or more buttons 114 and/or a crown 115.

The electronic device 100 can further include a band or a strap 102, or another component designed to attach the device 100 to a user or to otherwise provide wearable functionality. In some examples, the strap 102 can be a flexible material that can comfortably allow the device 100 to be retained on a user's body at a desired location. Further, the housing 101 can include a reception feature or features 113 therein that can provide attachment locations for the strap 102. In some examples, the strap 102 can be retained on the housing 101 by any desired techniques. For example, the strap 102 can include magnets that are attracted with magnets disposed within the housing 101, or can include retention components that mechanically retain the strap 102 against the housing 101 within the reception feature 113, or combinations thereof.

Figure 3:
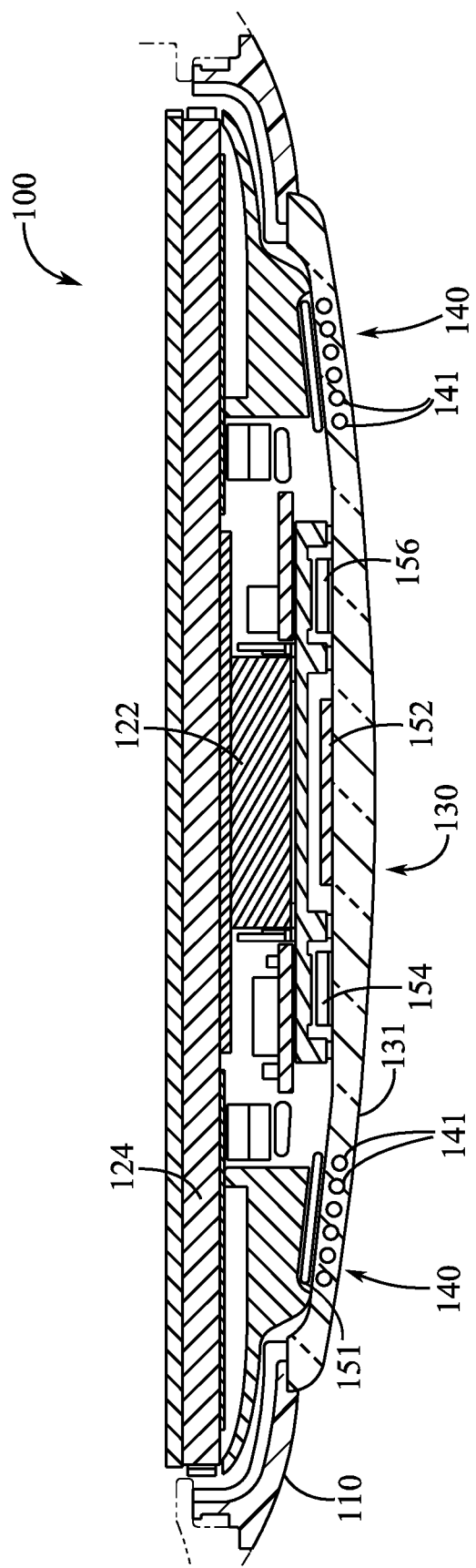
FIG. 3 shows a cross-sectional side view of the electronic device of FIG. 1.

FIG. 3 shows a cross-sectional side view of components of the electronic device 100, including internal components such as a display assembly 124, a battery 122, ferrite components 151, an optical sensor 152, and light emitting components 154, 156. Such components can be disposed within an internal volume defined at least partially by the housing 101, and can be affixed to the housing 101, via internal surfaces, attachment features, threaded connectors, studs, posts, and/or other fixing features, that are formed into, defined by, or otherwise part of the housing 101. The device 100 can also include an inductive charging component 140, for example, including an inductive coil 141. The inductive charging component 140 can be coupled to the battery 122 housed in the internal volume of the device 100 to enable wireless charging.

As shown in FIG. 3, the transparent component 130 can be joined with the back cover 110, which can be joined to a frame of the housing 101. In some examples, the transparent component 130 can have a peripheral shape corresponding to the shape of the aperture in which it is disposed, for example, as defined by the back cover 110. In some examples, the transparent component 130 can be a polymeric material, a ceramic material, an amorphous material such as glass, or combinations thereof. For example, the transparent component 130 can be sapphire or a polycarbonate material. The transparent component 130 be formed by a variety of processes, as discussed herein. In some examples, these formation processes can allow for the housing 101 to have a detailed shape or design that is tailored specifically to satisfy one or more needs, such as internal dimensional requirements, without the need for additional features to reinforce the structure of the housing. Additionally, artifacts of the manufacturing process of the housing can be eliminated.

Further, the transparent component 130 can be etched or molded such that the transparent component 130 includes trenches, grooves, or conduits configured to receive the inductive charging component 140. In some examples, the transparent component 130, or a portion of thereof, can be molded or otherwise formed around the inductive charging component 140. In some examples, the inductive charging component 140 can include a planar or non-planar (e.g., contouring to the shape of the transparent component 130) concentric induction coil 141. The induction coil 141 can be configured in a radial spiral (i.e., not stacked) and can be shaped to contour with the external shape of the transparent component 130. In some examples, the induction coil 141 can comprise a single layer spiral coil. That is, the coil 141 can comprise a conductive material, for example in the form of a wire, that is wound in a spiral about a central axis in a single layer. In some examples, this layer need not be a planar layer and can have a shape or profile conforming to a non-planar shape or profile of the component 130. In some examples, the single layer spiral coil can comprise a coil wound so that no portion of the coil is disposed over or overlies another portion of the coil, even though portions of the coil may not all be disposed along the same plane or at the same height.

In some examples, the transparent component 130 can define an exterior surface that is planar, and the inductive charging component 140 can be planar to conform to the planar exterior surface of the transparent component 130. Likewise, the transparent component 130 can define an exterior surface that is non-planar or includes non-planar portions, and the inductive charging component 140 can include a profile conforming to the non-planar exterior surface. The ferrite component 151 can also be configured in a substantially planar or sheet-like shape, or a shape corresponding to an interior surface defined by the component 130 which further improves space within the housing 101. Further, in some examples, the ferrite component 151 is also disposed within a thickness of the transparent component 130, using similar methods disclosed herein, to dispose the inductive charging component 140. The ferrite component 151 can be positioned directly above the inductive charging component 140 and disposed on an interior surface of the transparent component 130, or directly on the inductive charging component 140.

The induction coil 141 can be packed tightly together or can be configured to leave space between each turn. The coil 141 can have a diameter of approximately 200 microns. Individual coil turns or strands can be insulated with polyimide (PI) material and/or with the material of the transparent component 130. In some examples, the grooves or conduits in the transparent component 130 are at least as deep as the diameter of the coil 141 such that no portion of the coil 141 rises above an interior surface of the transparent component 130. Cosmetic ink can be applied on the exterior surface of the transparent component 130 to conceal the inductive charging component 140. The cosmetic ink can then be protected by a protective coating, such as a scratch resistant layer. In some examples, the cosmetic ink and the protective coating can be combined in a single substance. In some examples, masking can be used to ensure that the protective layer does not cover electrodes that can be present on an exterior surface of the component 130, such as to enable features of the device 100 that can require the electrodes to have contact with the skin of a user.

By positioning the inductive charging component 140 within a wall thickness of the transparent component 130, the inductive charging component 140 is able to reside closer to an inductive base charging pad (not shown) that can be positioned adjacent (e.g., below) the transparent component 130, such that the exterior surface of the transparent component 130 contacts the charging pad. Thus, the decrease in the distance between the respective inductive charging coils increases the charging efficiency of the device. It will be appreciated that a similar insert-molded coil concept can be used on the charging base itself to bring the inductive components closer still. Further, by disposing the inductive charging component 140 within a thickness of the transparent component 130, the space in which the inductive charging component 140 would have previously occupied is now free.

As discussed below, various methods of manufacture and construction can be implemented in order to achieve the disclosed features. For instance, the inductive charging component 140 can be placed into a trench, a groove, or a conduit that is etched into the transparent material 131 of the component 130. In some examples, the inductive charging component 140 is provided and the transparent material 131 of the component 130 can be molded around the inductive charging component 140. Further, the inductive charging component 140 can initially be disposed within a recess formed in the transparent material 131 of the component 130 and thereafter a fill material, such as an epoxy or other curable material, can be injected around the inductive charging component 140 to fix it within the recess. In some examples, the inductive coil 141 can be tightly wound such that no space exists between the coil, preventing fill material from penetrating between adjacent turns of the coil. Alternatively, the coil 141 can be configured such that gaps exist between each concentric wind of the coil 141. In this example, fill material can be disposed between the concentric coil rings. Further details of the relationship between an inductive charging component and a transparent component are provided below with reference to FIG. 4.

Figure 4:
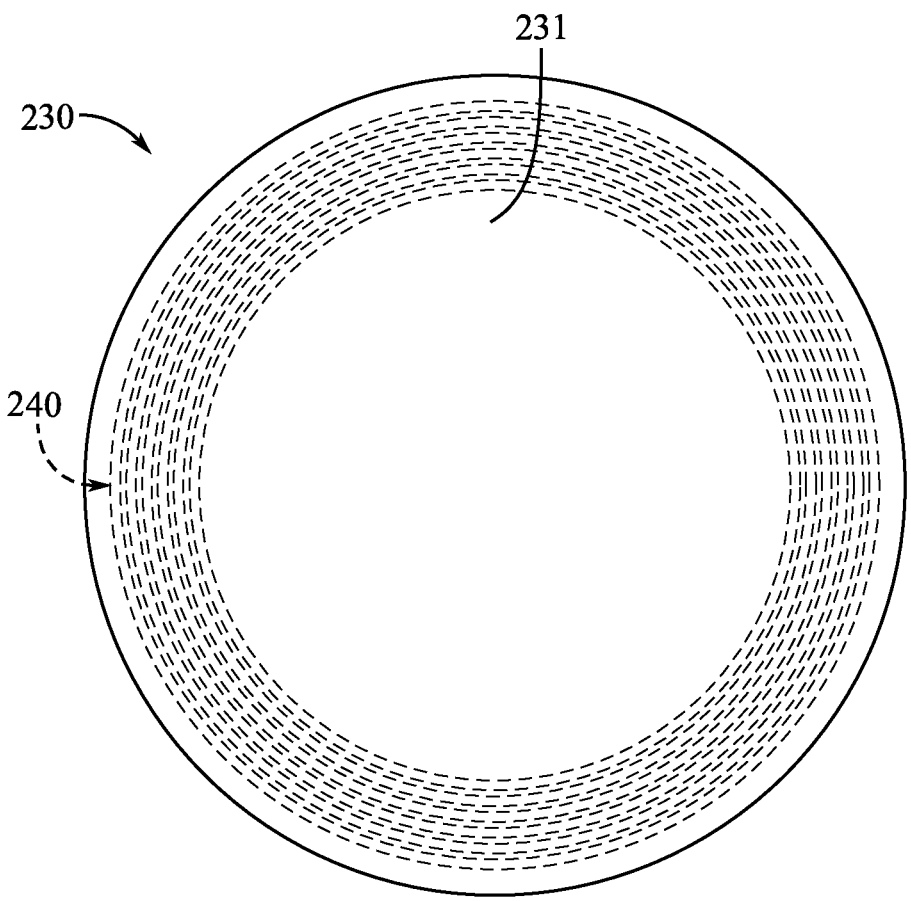
FIG. 4 shows a bottom view of a component of an electronic device.

FIG. 4 illustrates a transparent component 230 and an inductive charging component 240 represented in dashed lines and disposed within the transparent component 230, for example, surrounded by the transparent material 231 of the component 230. As shown, the inductive charging component 240 can follow a peripheral or perimeter shape of the transparent component 230. For instance, if the transparent component 230 is circular along a sectional plane, the inductive charging component 240 can also be circular. Thus, if the inductive charging component 240 includes an inductive coil, the coil can wind in a circular fashion along the perimeter of the housing component 230. It will be appreciated that the number of revolutions or concentric rings of the coil 240 can be more or less than those illustrated.

Any number or variety of electronic device components can include an integrated inductive charging component, as described herein. The process for disposing an inductive charging component within a wall or thickness of an electronic device component can include any combination of molding, curing, etching, carving, joining, co-forming, or other techniques or processes, as described herein. Various examples of inductive charging components integrated into components of electronic devices are described herein, and processes for forming the same are described below with reference to FIGS. 5-8.

Figure 5:
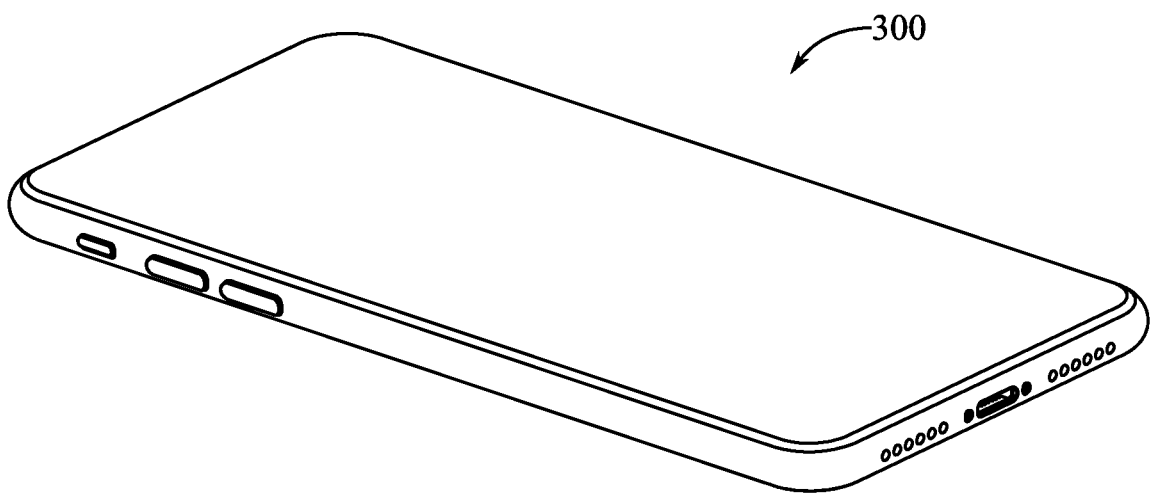
FIG. 5 shows a perspective view of an electronic device.

FIG. 5 shows an example of an electronic device 300. The electronic device 300 shown in FIG. 5 is a mobile phone, such as a smartphone. The smartphone of FIG. 5 is merely another representative example of a device that can be used in conjunction with the components and methods disclosed herein. Other examples include a media player, a media storage device, a portable digital assistant ("PDA"), a tablet computer, a computer, a mobile communication device, a GPS unit, a remote control device, and other similar electronic devices. The electronic device 300 can be referred to as an electronic device, a mobile phone, or a smartphone. Further details of the smartphone 300 are provided below with reference to FIGS. 6-8.

Figure 6:
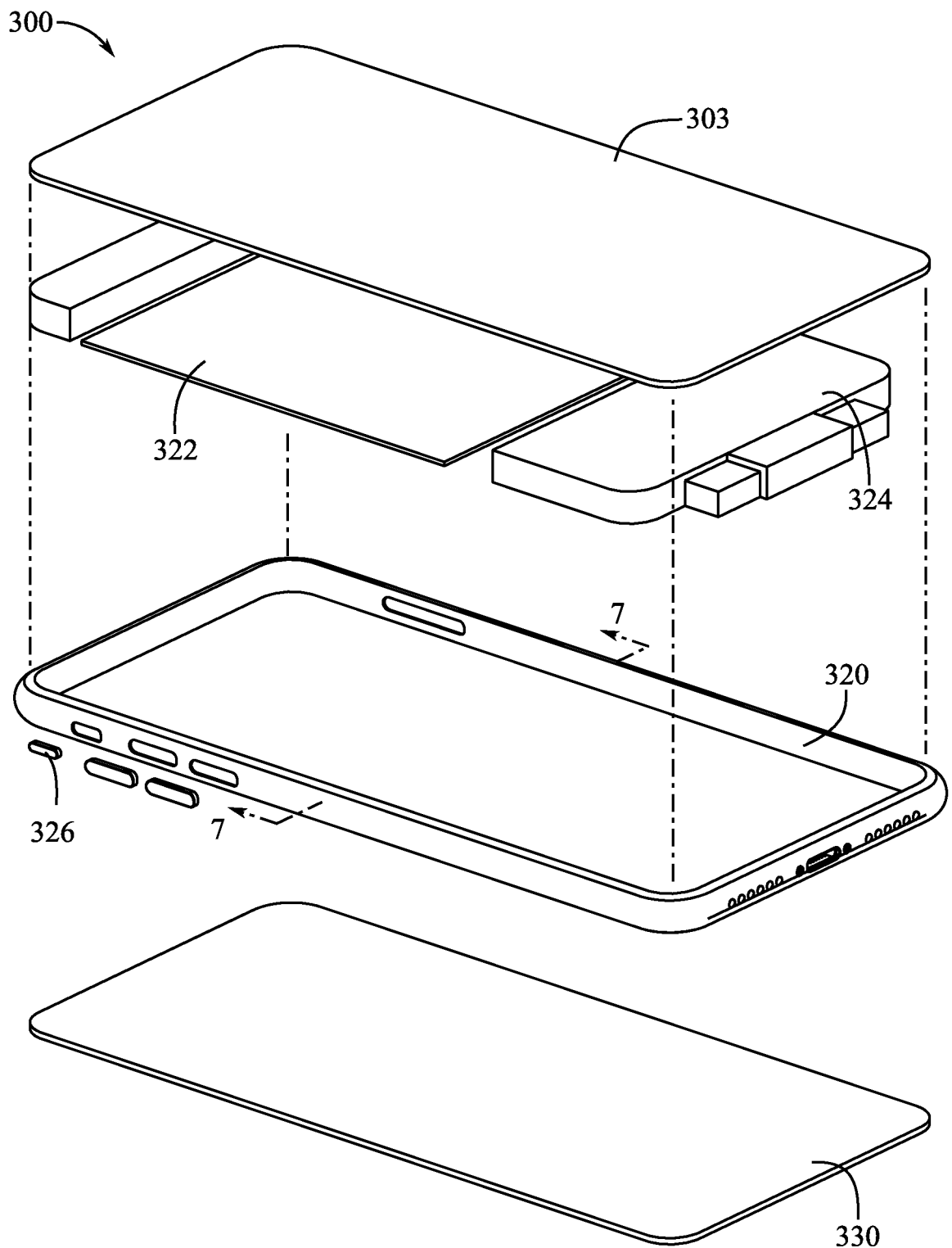
FIG. 6 shows an exploded perspective view of the electronic device of FIG. 5.

As shown in FIG. 6, the smartphone 300 can include a front cover 303, a battery 322, sidewalls or a band 320, input components 326, and a back cover 330. The housing of the device 300, including the band 320, can include one or more features configured to receive or to be coupled to other components of the device 300. For example, the band 320 can include any number of features such as apertures, cavities, indentations, and other mating features to receive and/or attach to one or more components of the device 300.

The device 300 can include internal components, such as a system in package (SiP) 324, including one or more integrated circuits such as a processors, sensors, and memory. The device 300 can also include a battery 322 housed in the internal volume of the device 300. The device 300 can also include one or more sensors, such as optical or other sensors, that can sense or otherwise detect information regarding the environment exterior to the internal volume of the device 300, as described further herein. Additional components, such as a haptic engine, can also be included in the device 300. The electronic device 300 can also include a display assembly. In some examples, one or more of these internal components can be mounted to a circuit board. The electronic device 300 can further include a support plate, also referred to as a back plate, a back cover, or a chassis, that can provide structural support for the electronic device 300. The back cover 330 can include a rigid material, such as a plastic or metals. Such components can be disposed within an internal volume defined, at least partially, by the sidewalls 320, and can be affixed to the sidewalls 320, via internal surfaces, attachment features, threaded connectors, studs, posts, and/or other fixing features, that are formed into, defined by, or otherwise part of the band 320. The back cover 330 can also be attached to the band 320, for example, via the one or more attachment features, or by any other desired techniques, for example, by an adhesive. Additional features of the device 300 are provided below with reference to FIG. 7.

Figure 7:
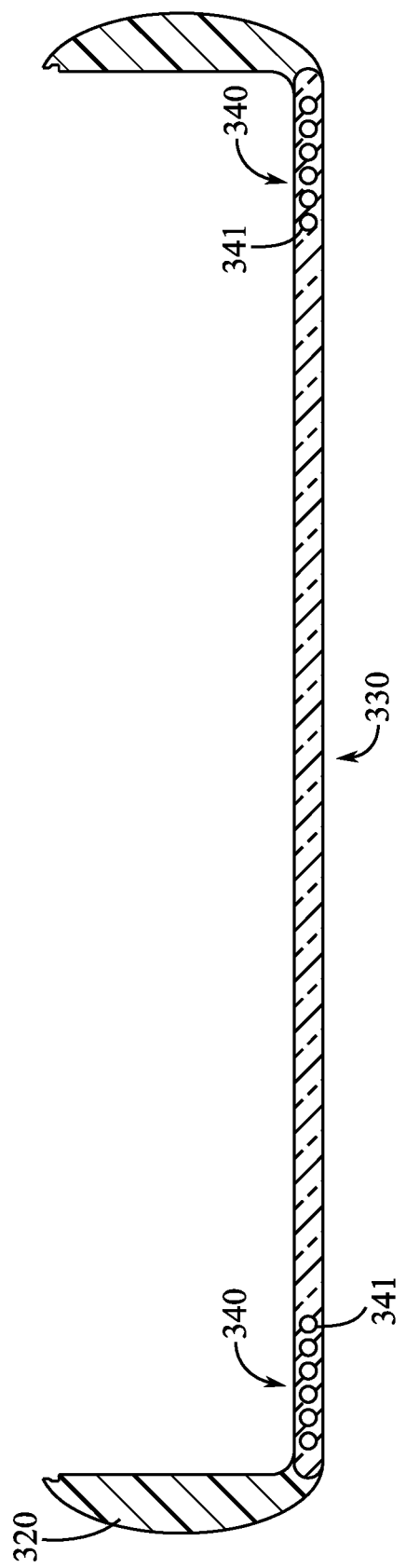
FIG. 7 shows a cross-sectional side view of a component of the electronic device of FIG. 5.

As shown in FIG. 7, the device 300 can also include an inductive charging component 340 disposed in, or at least partially surrounded by, the back cover 330. The inductive charging component 340 can be substantially similar to, and can include some or all of the features of the inductive charging components 140, 240 discussed above. For instance, the inductive charging component 340 can include a concentric inductive coil 341. The inductive coil 341 can be substantially similar to the coil 141 discussed above with reference to FIG. 3. As discussed below, in some examples, the inductive charging component 340 can be molded, embedded, or otherwise disposed into a thickness of the back cover 330 such that a distance between the inductive charging component 340 and an inductive base charging pad is minimized, thereby maximizing the inductive charging capacity of the electronic device 300. Further details of the relationship between the inductive charging component 340 and the back cover 330 are provided below with reference to FIG. 8.

Figure 8:
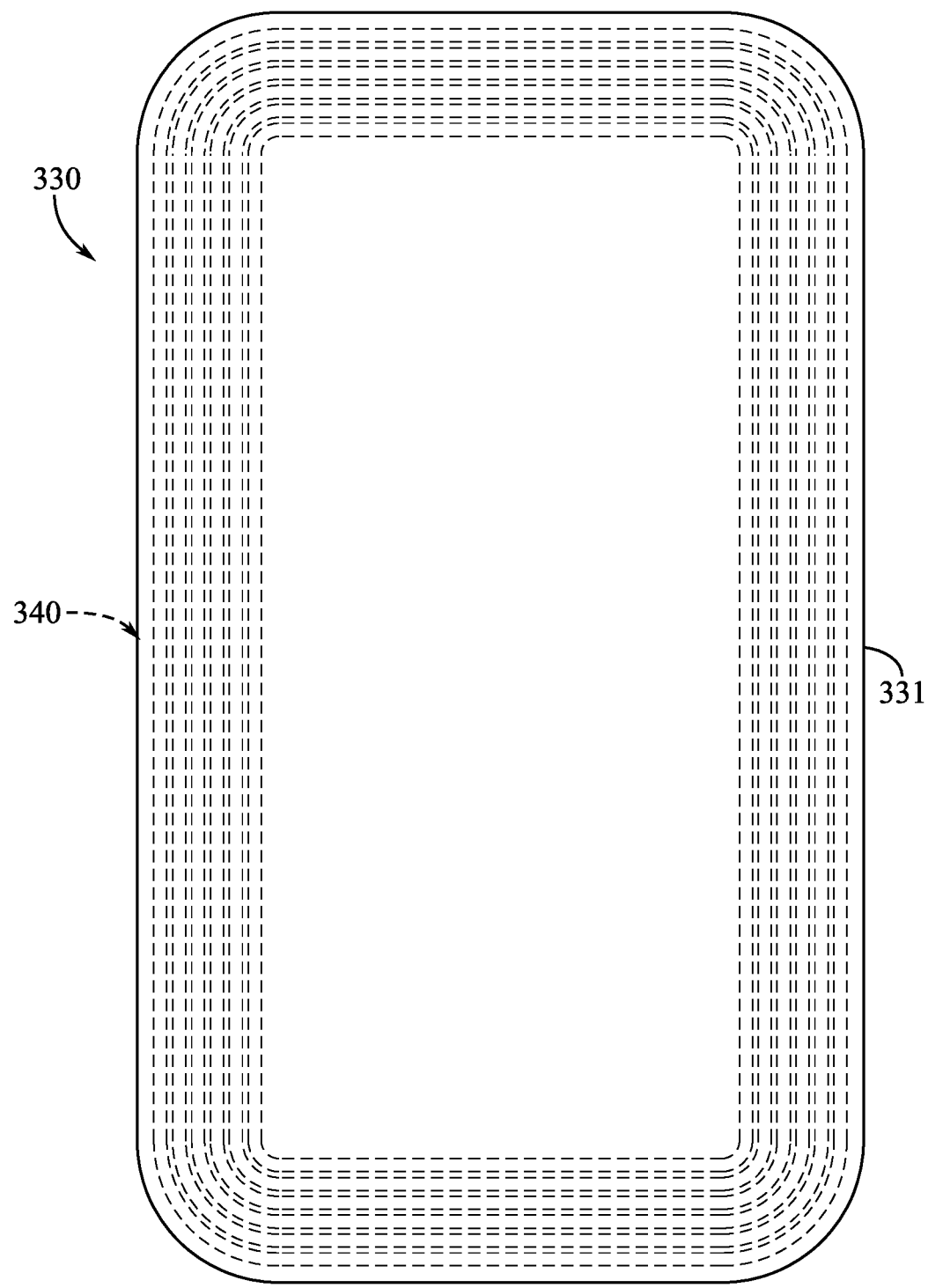
FIG. 8 shows a bottom view of the component of FIG. 7.

FIG. 8 illustrates a bottom view of the back cover 330 including an inductive charging component 340 illustrated in dashed lines and at least partially surrounded by the transparent material 331 forming the back cover 330. It will be appreciated that while FIG. 8 illustrates the inductive charging component 340 generally following the perimeter shape of the back cover 330, other shapes and locations are also possible, such as annular or circular shapes regardless of the perimeter shape of the device.

Any number or variety of electronic device components can include an integrated inductive charging component, as described herein. The process for disposing an inductive charging component within a wall or thickness of an electronic device component can include any combination of molding, curing, etching, carving, joining, co-forming, or other techniques or processes as described herein. Various examples of inductive charging components integrated into components of electronic devices as described herein, and processes for forming the same are described below with reference to FIGS. 9 and 10.

Figure 9:
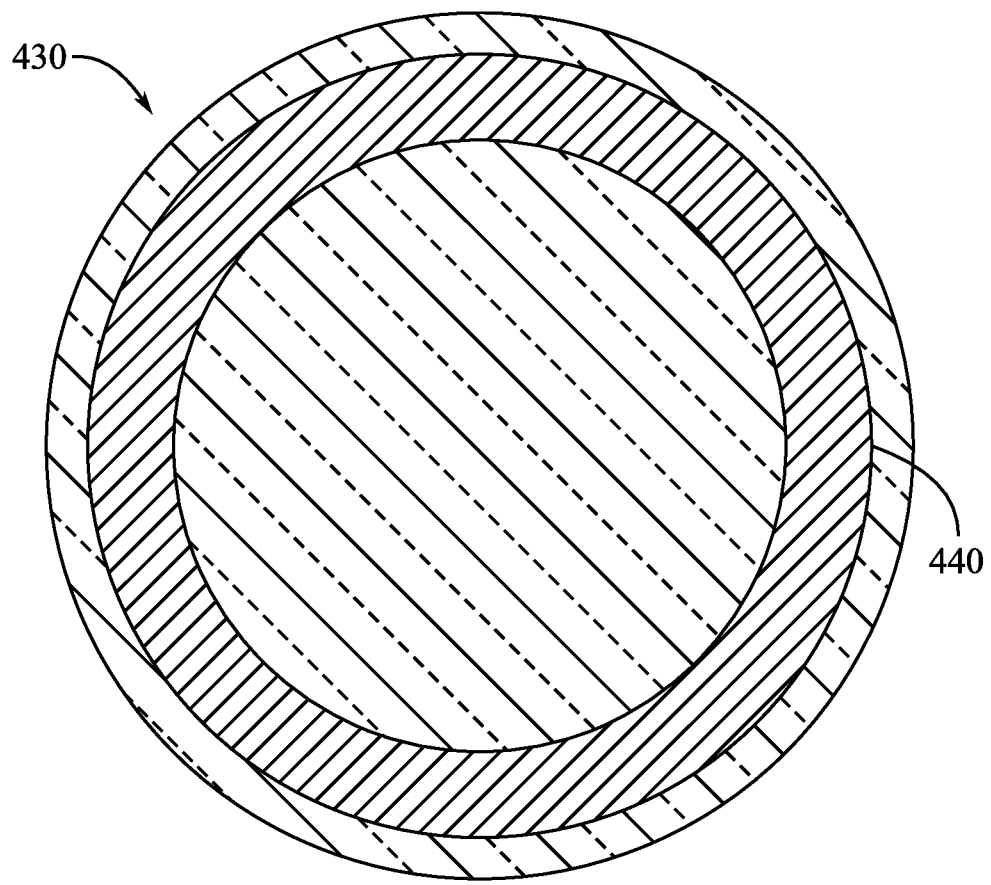
FIG. 9 shows a cross-sectional bottom view of a component of an electronic device.
Figure 10:
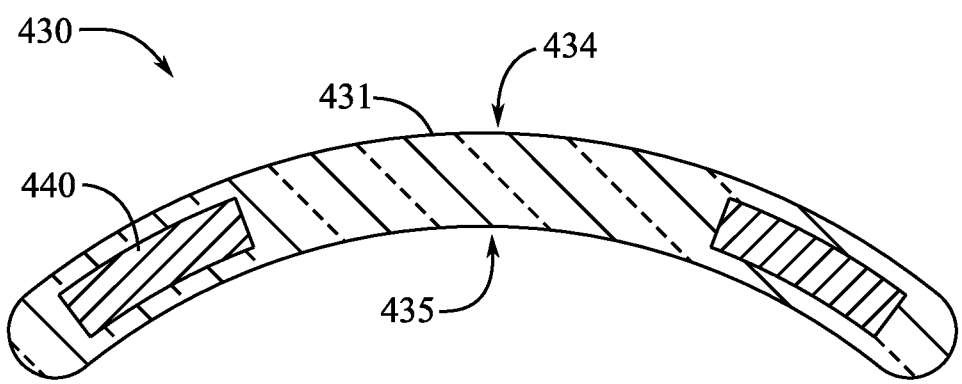
FIG. 10 shows a cross-sectional side view of the component of FIG. 9

FIGS. 9 and 10 illustrate a housing component 430 including a component 440 disposed within the housing component 430. In some examples, the housing component 430 can be substantially similar to, and can include some or all of the features of the housing components 130, 230, 330 described herein. In some examples, component 440 can be at least partially surrounded by the material 431, such as a transparent polymer material 431, forming the housing component 430. FIG. 10 illustrates a side cross-sectional view of the housing component 430 defining a first surface 434 and a second surface 435. The housing component 430 can be formed from any variety of materials 431 that do not block electromagnetic fields. For instance, the housing component 430 can be molded or formed from polymer and/or ceramic materials 431. The materials 431 can be transparent and/or opaque, and can be formed in any shape. As shown in FIGS. 9 and 10, the component 440 can be disposed within a thickness of the housing component 430. Further, the component 440 can contour to the shape of the housing component 430 such that if the housing component 430 has a curve, the component 440 can have or assume a similar curve.

In some examples, the component 440 can contour to match or approximate the shape of the first surface 434. In some examples, the component 440 can contour to the shape of the second surface 435. Further, the component 440 can comprise an inductive charging component and can be designed to contour to the shape of an adjacent charging base station or to the shape of an inductive charging component within the base station. As discussed above, a perimeter shape of the component 440 can follow a perimeter shape of the housing component 430. For instance, FIG. 9 shows the housing component 430 having a circular perimeter and the component 440 likewise has a circular perimeter. However, as explained in the discussion of FIG. 8, this is not necessarily required.

In some examples, the component 440 can be or comprise an inductive charging component 440. The above discussed examples allow inductive components within electronic devices, and also allow for charging pads or other external inductive charging components to be brought in closer physical proximity to the inductive charging components, such as inductive charging component 440, because the inductive charging component 440 is at least partially embedded in the housing component 430, thereby improving the mutual inductance and increasing the charging efficiency. In some examples, the inductive charging component 440 can be separated from an ambient environment, and thus an external charging component or device in the ambient environment and adjacent the housing component 430, by less than about 5 millimeters (mm), less than about 4 mm, less than about 3 mm, less than about 2 mm, less than about 1 mm, or an even smaller distance. In some examples, the inductive charging component 440 can be separated from an ambient environment, for example, an ambient environment adjacent to the surface 435, by between about 1 mm and about 7 mm, between about 2 mm and about 6 mm, or between about 3 mm and about 5 mm. In still other examples, the inductive charging component 440 can be exposed at a surface of the housing component 430, such as at the exterior surface 435 of the housing component 430. Accordingly, in some examples, the inductive charging component 440 can at least partially define a surface of the component 430, such as a portion of the surface 435.

As described herein, the overall charging efficiency of an inductive charging system, such as a system including the inductive charging component 440 and a corresponding external inductive charging base station, can increase with decreasing physical distance between the inductive charging component 440 and the corresponding inductive charging component of the base station or external charging apparatus. This efficiency can also be referred to as the mutual inductance of the system, also known as a "k-value" of the system. In some examples, the inductive charging component 430 can have a mutual inductance (e.g., k-value) with a corresponding external inductive charging base disposed substantially adjacent to the component 430 of at least about 0.6. In some examples, the mutual inductance can be between about 0.4 and about 0.8, or between about 0.5 and about 0.7. In some examples, the transparent housing component 430 can be formed from polymeric materials, such as polycarbonate, acrylics, polyvinyl chloride, polyethylene terephthalate, and/or other polymeric materials transparent to a desired range of wavelengths of light. In some examples, the transparent component 430 can include a ceramic material such as sapphire. In some examples, the transparent component 430 can include any combination of polymeric, ceramic, or other materials as described herein.

In some examples, the component 440 can be or comprise one or more other components of an electronic device. For example, the component 440 can be or comprise any component that can interact with or communicate with or through the environment exterior to the device including the component 430. Similar to the reasons described above that it is beneficial to reduce the distance between an inductive charging component 440 and the exterior environment, it can be beneficial to reduce the distance between any number of other types of components and the exterior environment. In some examples, the component 440 can comprise one or more antennas, sensors, light emitting components, cameras, or any other component as desired. In some examples, the component 440 can comprise a light-emitting component and/or optical sensor that can be substantially similar to the optical sensor 152 and light emitting components 154, 156 described with respect to FIG. 3. In some examples, the component 440 can comprise a relatively temperature sensitive component and the material 431 of the component 430 can provide a level of thermal protection or insulation to the component 440. In some examples, at least some of the component 440 can protrude from or be disposed outside the material 431, such as to enable or provide an electrical or other form of connection with one or more components of a device including the component 430.

The aspects discuss above with respect to FIGS. 9 and 10 can be applied to a broad range of components and devices that implement inductive charging. Further, the inductive charging component is not limited to metal coil or wires, but can include any conductive material in any shape that is suitable for transmitting or receiving energy wirelessly via inductance. Further, the housing component 430 containing the inductive charging component 440 can include all or a portion of a housing of an electronic device, and is not limited to defining an external wall of the housing. In some examples, the component 430 can be disposed within a housing or can be separate from a housing entirely. Further details of the relationship between the inductive charging components and housing components are provided below with reference to FIG. 11.

Figure 11:
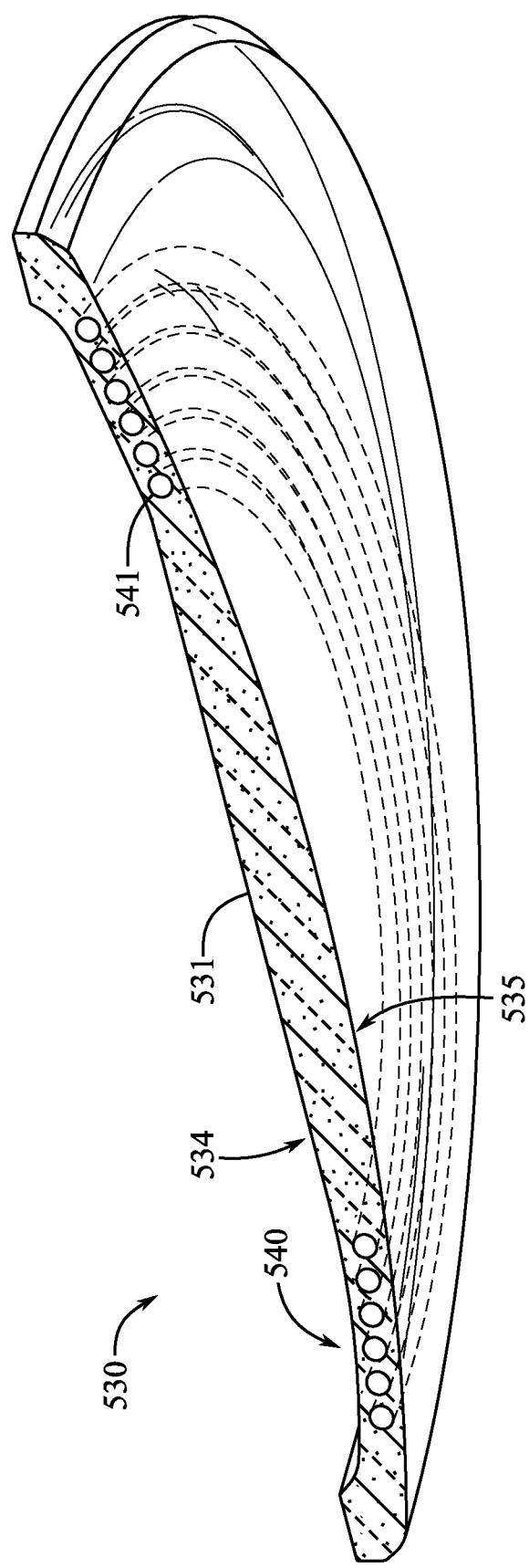
FIG. 11 shows a perspective cross-sectional view of a component of an electronic device.

FIG. 11 illustrates a perspective cross-sectional view a housing component 530 defining an interior surface 534 and an exterior surface 535. The housing component 530 can be similar to, and can include some or all of the features of the housing components, such as housing components 130, 230, 330, 430 discussed herein. Similarly, the inductive charging component 540 can include an inductive charging coil 541 and can be substantially similar to, and can include some of all of the features of the inductive charging components described herein, such as inductive charging components 140, 240, 340, 440. The thickness of the material 531 forming the housing component 530 can include conduits or grooves in which an inductive charging component 540 is disposed. For example, the material 531 can be molded or formed around the inductive charging component 540 to define the conduits or grooves. In some examples, grooves, tranches, conduits, or other features can be formed into the material 531, and the inductive charging component 540 can be disposed into these features. In some examples, a profile of the inductive charging component 540 contours or matches only a portion of a profile of the housing component 530. For instance, the housing component 530 can define a variable shape with changing curvature, as shown in FIG. 11. Thus, the inductive charging component 540 can contour only to a portion of the profile of the housing component 530, for example, only a portion of one or both of the surfaces 434, 435 as shown. Likewise, the profile of the inductive charging component 540 can change to match a change in the contour of the housing component 530 or the surfaces 534, 535 defined by the component 530. In some examples, one or both of the surfaces 534, 535 can have any desired shape or geometry. For example, one or both of surfaces 534, 535 can have one or more convex or concave portions. In some examples, the geometry of one or both of the surfaces 534, 535 can be irregular or can include any number, size, and/or variety of non-planar regions or features.

Any number or variety of electronic device components can include an integrated inductive charging component, as described herein. The process for disposing an inductive charging component within a wall or thickness of an electronic device component can include any combination of molding, curing, etching, carving, joining, co-forming, or other techniques or processes as described herein. Various examples of inductive charging components integrated into components of electronic devices as described herein, and processes for forming the same, are described below with reference to FIGS. 12A-16.

Figures 12A, 12B:
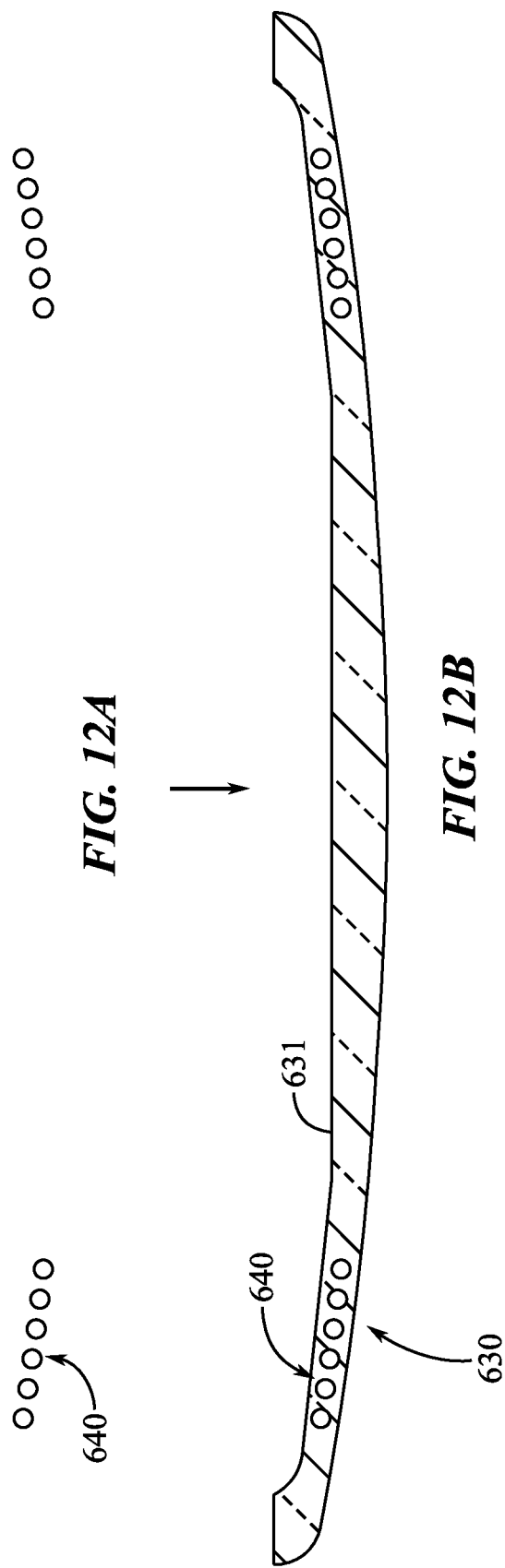
FIGS. 12A-12B show a various stages of a process for forming a component.

FIGS. 12A-12B illustrate a process by which an inductive charging component 640 is formed into a thickness of the housing component 630 and substantially surrounded by the material 631 of the housing component 630. The housing component 630 can include any suitable material, such as polymeric, ceramic, or combinations thereof, as discussed herein. As illustrated in FIG. 12A, the inductive charging component 640 can include a concentric coil. In some examples, the inductive charging component 640 can be formed separate from the housing component 630. The housing component 630 can be molded or formed using any known methods. In some examples, the material 631 of the housing component 630 can be molded, cast, or otherwise formed at least partially around the inductive charging component 640 so that any trenches, grooves, or conduits defined by the material 631 and receiving the inductive charging component 640 therein can be contoured or shaped to surround the inductive charging component 640. In other words, the molding or forming process of the component 630 itself can form or define the regions or portions in which the inductive charging component 640 is disposed. In some examples, the inductive charging component 640 is provided, as shown in FIG. 12A, and the material 631 that will eventually form the housing component 630 can be provided around some or all of the inductive charging component 640 in a molten, malleable, pliable, or liquid form. For example, where the material 631 includes a polymer, the polymer material 631 can be heated to a liquid or malleable state, and can be provided into a mold containing the inductive charging component, whereupon the material 631 can surround or partially surround the inductive charging component 640. The material 631 can then be cooled to a substantially solid state to form the housing component 630, including the inductive charging component 640 disposed therein. In some examples, the material 631 can be provided as part of an injection molding process.

In some examples, the material 631 can be provided at least partially around the inductive charging component 640 in a liquid, malleable, or moldable state and can be exposed to one or more curing agents to set or solidify the material 631 and form the housing component 630. For example, the material 631 can be provided at least partially around the inductive charging component 640 in a desired amount and shape, and can be exposed to a desired atmosphere, for example, a moisture containing atmosphere, to cure and to solidify the material 631. In some examples, the moldable material 631 can be exposed to electromagnetic radiation, such as UV radiation, to solidify or cure the material 631 around the inductive charging component 640. In some examples, the material 631 forming the housing component 630 is formed or molded around the inductive charging component 640, according to any suitable molding or manufacturing process, such that the inductive charging component 140 resides within a thickness of the transparent component 630, as described herein.

In some examples, the material 631 of the housing component 630 can be unitary or can include additional components, segments, or materials, and can be formed into a desired shape by any desired process, such as injection molding, casting, or infilling. For instance, the transparent components and housing components discussed herein can be formed by any suitable manufacturing process, such as an additive or subtractive process. Further details of processes for providing an inductive charging component in a housing component are provided below with reference to FIG. 13A-13D.

Figure 13A:
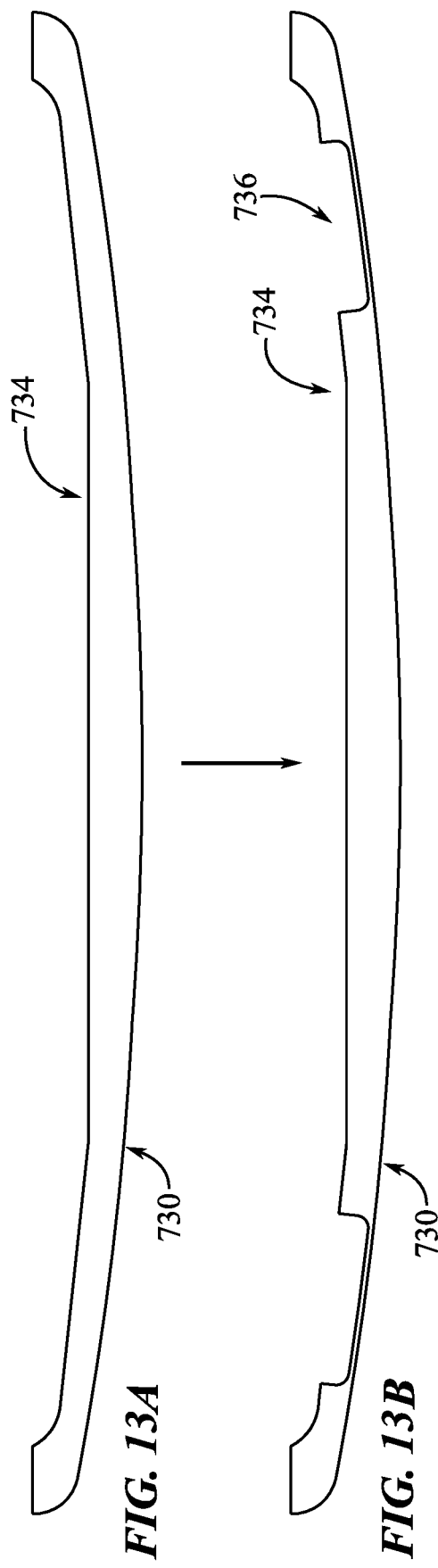
FIGS. 13A-13D show various stages of a process for forming a component.
Figure 13B:
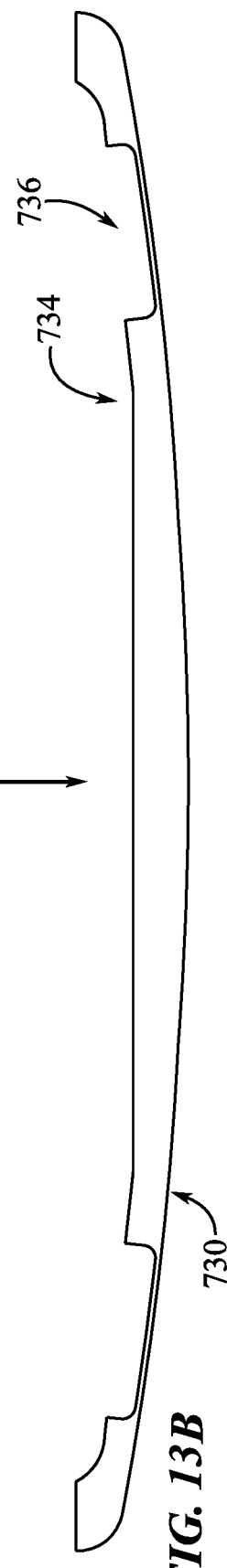

FIGS. 13A-13D illustrate a process by which an inductive charging component 740 can be included in a thickness of a housing component 730. In FIG. 13A, a housing component 730 including an interior surface 734 is provided. The housing component 730 can be similar to the housing components discussed herein, such as housing components 130, 230, 330, 430, 530. In FIG. 13B, a recess 736 can be formed in the portion of the component 730 defining the interior surface 734, for example, by removing material from the component 730 by etching, machining, drilling, or any other process or combination of processes. In some examples, the recess 736 defined by the component 730 can be carved out of the housing component 730 after formation of the component 730 shown in FIG. 13A. In some examples, the recess 736 can be a tunnel or a conduit that is drilled into the component 730 and the component can define only a relatively small port, opening, or aperture in communication with the tunnel through which a coil 741 of the inductive charging component 740 can be inserted.

In some examples, however, the formation process may not include the step illustrated in FIG. 13A and the housing component 730 can be initially molded or formed in a shape defining the recess 736, as shown in FIG. 13B. In some examples, after formation of the housing component 730, the recess 736 can be etched into the thickness of the housing component 730 to accommodate the inductive charging component 740. In some examples, the recess 736 is etched or formed such that the recess 736 is exposed from an interior surface 734 of the housing component 730. In still other examples, the recess 736 can be exposed from an exterior surface of the housing component 730. In some examples, the housing component 730 can be formed by a two shot or double shot molding process, where the first shot can form the component 730 defining a trench 736, as shown in FIG. 13B. Although illustrated as defining one trench or recess 736, it will be appreciated that the component 730 can define any number of trenches, recesses, cavities, tunnels, or other features to receive an inductive charging component 740 or any other component, as described herein.

Figure 13C:
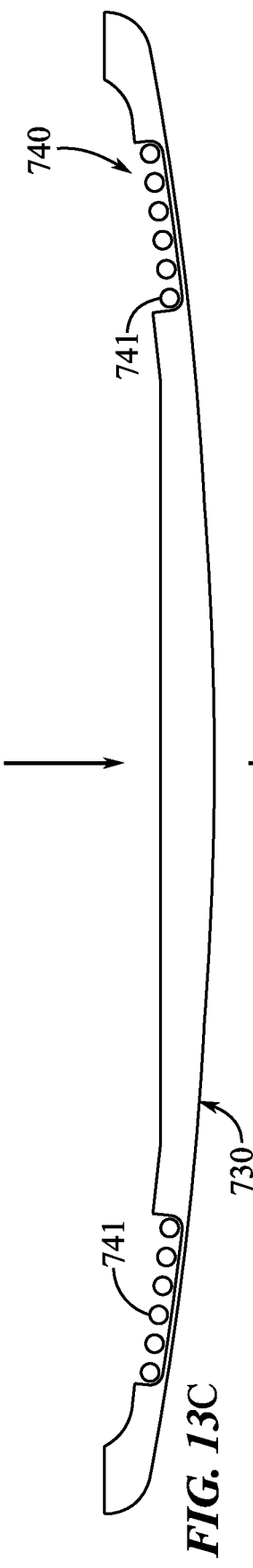

In FIG. 13C, inductive charging component 740 is disposed or placed within the recess 736. The inductive charging component 740 can be placed and held in a desired position relative to the component 730 and trench 736 by any desired technique. In some example, the inductive charging component 740 can be held in a mold or cast containing the component 730 defining the trench 736 in a desired orientation. In some example, additional component or features can hold the inductive charging component 740 in a desired position and these components or features can be removed subsequent to the processes used to form the component 730. Additionally, any number of leads or connectors may extend from the inductive charging component 740 to connect to a battery or other chargeable component.

Figure 13D:
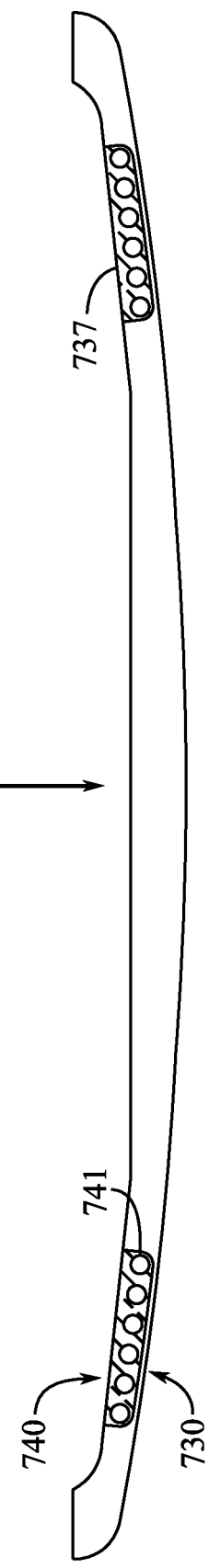

In FIG. 13D, a fill material 737, such as an epoxy or other curable material, is injected or otherwise provided into the recess 736 such that it at least partially surrounds the inductive charging component 740. Further, after depositing the inductive charging component 740 and fill material 737 within the recess 736, a protective coating (e.g., silicon dioxide or other insulator) can be place over all or a portion of the fill material 737, for example, to seal the inductive charging component 740 within the recess. The coating can also serve to secure the fill material 737 containing the inductive charging component 740 within the recess 736.

In some examples, the housing component 730 can be formed from, or can include, any desired material, such as ceramics, polymeric materials, or combinations thereof. In some examples, the housing component 730 can include ceramic materials such as glass, sapphire, zirconia, spinel and/or other ceramic materials transparent to a desired range of wavelengths of light. In some examples, the housing component 730 can be formed from polymeric materials, such as polycarbonate, acrylics, polyvinyl chloride, polyethylene terephthalate, and/or other polymeric materials transparent to a desired range of wavelengths of light. In some examples, a portion of the housing component 730 can include a ceramic material and a different portion of the housing component 730 can include a polymeric material. In some examples the fill material 737 can be formed from epoxy resins, polymeric materials, such as polycarbonate, acrylics, polyvinyl chloride, polyethylene terephthalate, other polymeric materials, and/or combinations thereof. The housing component 730 and fill material 737 can be joined in any suitable manner. For instance, the fill material 737 can be joined to the housing component with an adhesive, by directly fusing the materials together, by mechanical interlock or interaction, or combinations thereof. In some examples, as the fill material 737 cures, it can adhere to the housing component 730. Other methods for bonding, joining, or integrally forming one or more portions can be used in any desired combination. In some examples, the fill material 737 is formed with trenches that correspond to the inductive charging component 740 and the fill material 737 is placed into the trench 736 to secure the inductive charging component 740 between the housing component 730 and the fill material 737. Further details of processes for inserting an inductive charging component into a housing component are provided below with reference to FIG. 14A-14C.

FIGS. 14A-14C illustrate a process for molding an inductive charging component 840 into a housing component 830. As shown in FIG. 14A, a base portion or shell 831 defining an exterior surface 835 can be provided. The base portion 831 can be formed from polymeric materials, such as polycarbonate, acrylics, polyvinyl chloride, polyethylene terephthalate, and/or other polymeric materials. The base portion 831 can be formed by any manufacturing process, such as an additive or subtractive process, for example, injection molding or casting. In some examples, the base portion 831 can include or be formed from a ceramic material or materials, such as glass or sapphire. In some examples, the base portion 831 can be formed from a molded slurry including ceramic particles and a binder that can be sintered to form the base portion 831.

FIG. 14B illustrates an inductive charging component 840 including a coil 841 positioned or placed on, near to, or adjacent to an interior surface of the base portion 831 opposite the exterior surface 835. The inductive charging component 840 can be held or retaining in this desired position by any desired technique or component. FIG. 14C illustrates a fill material 837 being distributed onto the interior surface of the base portion 831 such that the inductive charging component 840 is at least partially surrounded by the fill material 837. The fill material 837 can be substantially similar to the fill material 737 described in reference to FIGS. 13A-13C. For instance, the fill material 837 can be formed from epoxy resins, polymeric materials, such as polycarbonate, acrylics, polyvinyl chloride, polyethylene terephthalate, and/or other polymeric materials. The fill material 837 can be dispensed around the inductive charging component 840 while in a pre-formed state and can thereafter cure, harden, or solidify around the inductive charging component 840. The housing component base portion 831 and the fill material 837 can be joined in any suitable manner. For instance, the fill material 837 can be joined to the base portion 831 with an adhesive or by directly fusing the materials together. In some examples, as the fill material 837 cures, it naturally adheres to the base portion 831. Other methods for bonding, joining, or integrally forming one or more portions can be used in any desired combination. In some examples, the fill material 837 is formed with trenches that correspond to the inductive charging component 840, and the fill material 837 is placed on top to secure the inductive charging component 840 between the base portion 831 and the fill material 837. The cured or solidified fill material 837 thereby defines an interior surface 834 of the housing component 830. In some examples, the base portion 831 can include a first transparent material, and the fill material 837 can include a second, different transparent material adjacent to the first transparent material and encompassing the inductive charging component 840. The first transparent material can include a polymer material, or a ceramic material such as sapphire. The second transparent material can include a polycarbonate, an epoxy or other curable material, as described above.

The fill material 837 can be overmolded by any number of additive manufacturing or molding processes. For example, the fill material 837 can be formed by an injection molding process using a mold that contains the base portion 831 and the inductive charging component 840. In other examples, the fill material 837 can be overmolded by an additive process, such as a 3D printing process. For example, a material can be 3D printed at least partially around the base portion 831 and the inductive charging component 840. 3D printing and other precise manufacturing processes can allow for the formation of an overmold material 837 that can assume a shape or include features that cannot be formed by other molding or manufacturing processes. Further details of processes for inserting an inductive charging component into a housing component are provided below with reference to FIGS. 15 and 16.

Figure 15:
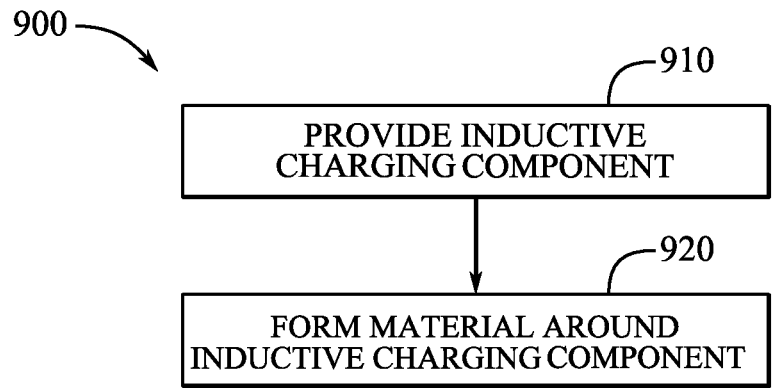
FIG. 15 shows a process flow diagram of a process for forming a component.

FIG. 15 illustrates a process flow diagram of a process 900 for disposing an inductive charging component within a thickness of a portion of wall of an electronic component, as described herein. According to FIG. 15, an inductive charging component is provided at block 910. Thereafter, at block 920, material is formed around the inductive charging component.

At block 910, an inductive charging component is provided. In some examples, the inductive charging component is a coil as described above. In some examples the inductive charging component is placed onto a substrate or into a mold cavity that defines the desired shape of the housing component. The inductive charging component can be secured in place by clamps, fasteners, or any other suitable securing device.

At block 920, fill material is formed around the inductive charging component. In some examples, the inductive charging component can be positioned in a mold or other apparatus in a desired orientation and the fill material can be molded at least partially around the inductive charging component. Any process for forming a fill material around the inductive charging component can be used, such as a molding or injection molding process. In some examples, the fill material can be a thermoset polymer, such as an epoxy or a resin. In some examples, the fill material can be a thermoplastic polymer. In some examples, the fill material can be a combination of any thermoset and thermoplastic polymer. In some examples, the fill material can be provided at least partially around the inductive charging component in a liquid or viscous form, and can then be solidified by curing or cooling to form the component. In some examples, the fill material has already cooled or has been formed and has been etched to define trenches or features configured to receive the provided inductive charging component. In some examples, the fill material is specifically molded or formed to define trenches configured to receive the inductive charging component. In some examples, the process 900 can include the process stages illustrated in FIGS. 12A-12B.

Figure 16:
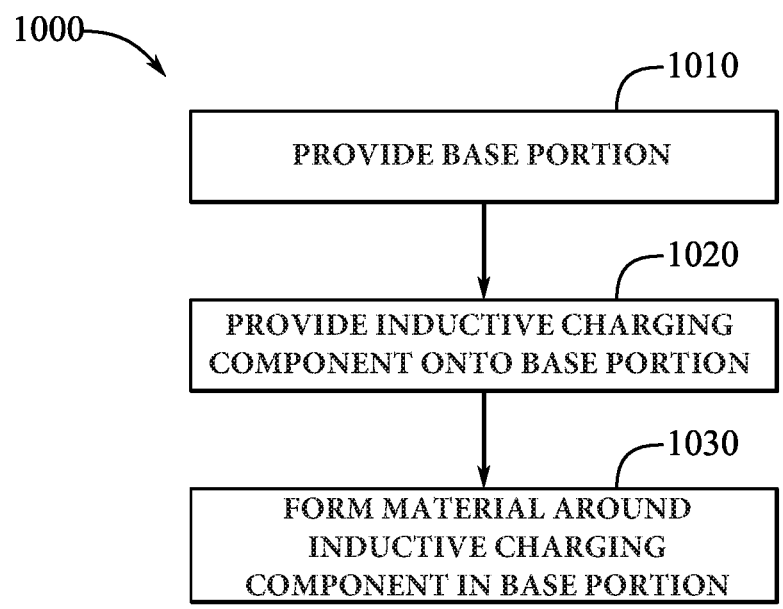
FIG. 16 shows a process flow diagram of a process for forming a component.

FIG. 16 illustrates a process flow diagram of a process 1000 for disposing an inductive charging component within a thickness of a wall or a portion of the component. According to FIG. 16, the process 1000 can include providing a base portion at block 1010. An inductive charging component can then be provided onto the base portion at block 1020. Material can then be formed around the inductive charging component in the base portion at block 1030.

At block 1010, a base portion is provided. The base portion can include the materials described herein. For example, the base portion can be formed from polymeric materials, such as polycarbonate, acrylics, polyvinyl chloride, polyethylene terephthalate, and/or other polymeric materials. In some examples the base portion is formed from a ceramic material or materials. The ceramic material can include or assume any shape or form of ceramic material. For example, the ceramic material can include ceramic particles, pellets, spheres, rods, tubes, fibers, or other geometries in any amount or combination. In some examples, the ceramic material can be a substantially contiguous and/or a substantially unitary ceramic body. The ceramic material can include zirconia, alumina, or combinations thereof.

At block 1020, an inductive charging component is provided onto the base portion. In some examples, the inductive charging component is a coil, as described above. The inductive charging component can be positioned onto, near to, or adjacent to the base portion. In some examples, the inductive charging component is secured to the base portion via fasteners and/or adhesive prior to a fill material being disposed around the inductive charging component, as described below at block 1030.

At block 1030 material is formed around the inductive charging component in the base portion. In some examples, the inductive charging component can be positioned in a mold or another apparatus in a desired orientation, and the fill material can be molded at least partially around the inductive charging component. Any process for forming a fill material around the inductive charging component can be used, such as a molding or injection molding process. In some examples, the fill material can be a thermoset polymer, such as an epoxy or resin. In some examples, the fill material can be a thermoplastic polymer. In some examples, the fill material can be a combination of any thermoset and thermoplastic polymer. In some examples, the fill material can be provided at least partially around the inductive charging component in a liquid or viscous form and can then be solidified by curing or cooling to form a substrate. The process 1000 include some or all of the process stages illustrated in FIGS. 13A-14C.

Any of the features or aspects of the components discussed herein can be combined or included in any varied combination. For example, the design and shape of any substrates, components, and/or fill or overmold material is not limited in any way and can be formed by any number of processes, including those discussed herein. Further, the inductive charging component can be molded or disposed at least partially within the housing component at any time, even during formation of the component, and by any number of processes, including those discussed herein. A component, such as those including an inductive charging component can be or can form all or a portion of a component, such as a housing, for an electronic device.

To the extent applicable to the present technology, gathering and use of data available from various sources can be used to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the terms exterior, outer, interior, inner, top, bottom, upper, and lower are used for reference purposes only. An exterior or outer portion of a component can form a portion of an exterior surface of the component but may not necessarily form the entire exterior of outer surface thereof. Similarly, the interior or inner portion of a component can form or define an interior or inner portion of the component but can also form or define a portion of an exterior or outer surface of the component. A top portion of a component can be located above a bottom portion in some orientations of the component, but can also be located in line with, below, or in other spatial relationships with the bottom portion depending on the orientation of the component.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
a housing component comprising a first transparent housing material at least partially defining an internal volume and a second transparent housing material adjacent to the first transparent housing material, the second transparent material including a wall;
a coiled component embedded within the wall; and
a battery disposed in the internal volume and electrically connected to the coiled component.

2. The electronic device of claim 1, wherein the coiled component comprises an inductive charging component.

3. The electronic device of claim 1, wherein:
the coiled component comprises a sensor in communication with an ambient environment through the housing component; and
the first transparent housing material comprises a transparent polymer material.

4. The electronic device of claim 1, wherein the housing component at least partially defines a non-planar exterior surface of the electronic device.

5. The electronic device of claim 4, wherein the coiled component comprises a coil of conductive material having a profile conforming to the non-planar exterior surface.

6. The electronic device of claim 1, wherein the first transparent housing component further comprises a lens.

7. The electronic device of claim 1, further comprising a display assembly at least partially defining an exterior surface of the electronic device.

8. A housing for an electronic device, comprising:
a transparent portion at least partially defining an internal volume; and
an inductive charging component integrated within the transparent portion between an exterior surface and an interior surface of the transparent portion, wherein the inductive charging component is separated from an ambient environment by less than 5 millimeters.

9. The housing of claim 8, wherein:
the transparent portion comprises a transparent polymer and defines a non-planar exterior surface; and
the inductive charging component comprises a coil of conductive material having a profile that conforms to the non-planar exterior surface.

10. The housing of claim 8, wherein the transparent portion comprises:
a first transparent material defining an exterior surface of the housing; and
a second transparent material adjacent to the first transparent material, the second transparent material encompassing the inductive charging component.

11. The housing of claim 10, wherein the first transparent material comprises a ceramic and the second transparent material comprises a polymer.

12. The housing of claim 8, wherein the inductive charging component has a k-value of at least 0.6.

13. The housing of claim 8, wherein the transparent portion comprises polycarbonate.

14. A method of forming a housing component for an electronic device, comprising:
forming a material around an inductive charging coil to form the housing component such that the inductive charging coil is embedded within a thickness of the material, wherein the material comprises a polymer or a glass material;
disposing the inductive charging coil into a trench etched into the housing component; and
filling the trench with an epoxy material to hold the inductive charging coil;
the inductive charging coil comprising a single layer spiral coil disposed in a non-planar arrangement.

15. The method of claim 14, wherein the material is transparent.

16. The method of claim 14, wherein the housing component comprises a transparent back cover of the electronic device.

17. The method of claim 14, wherein forming the material comprises a two-shot molding process.

* * * * *